Figure 1:
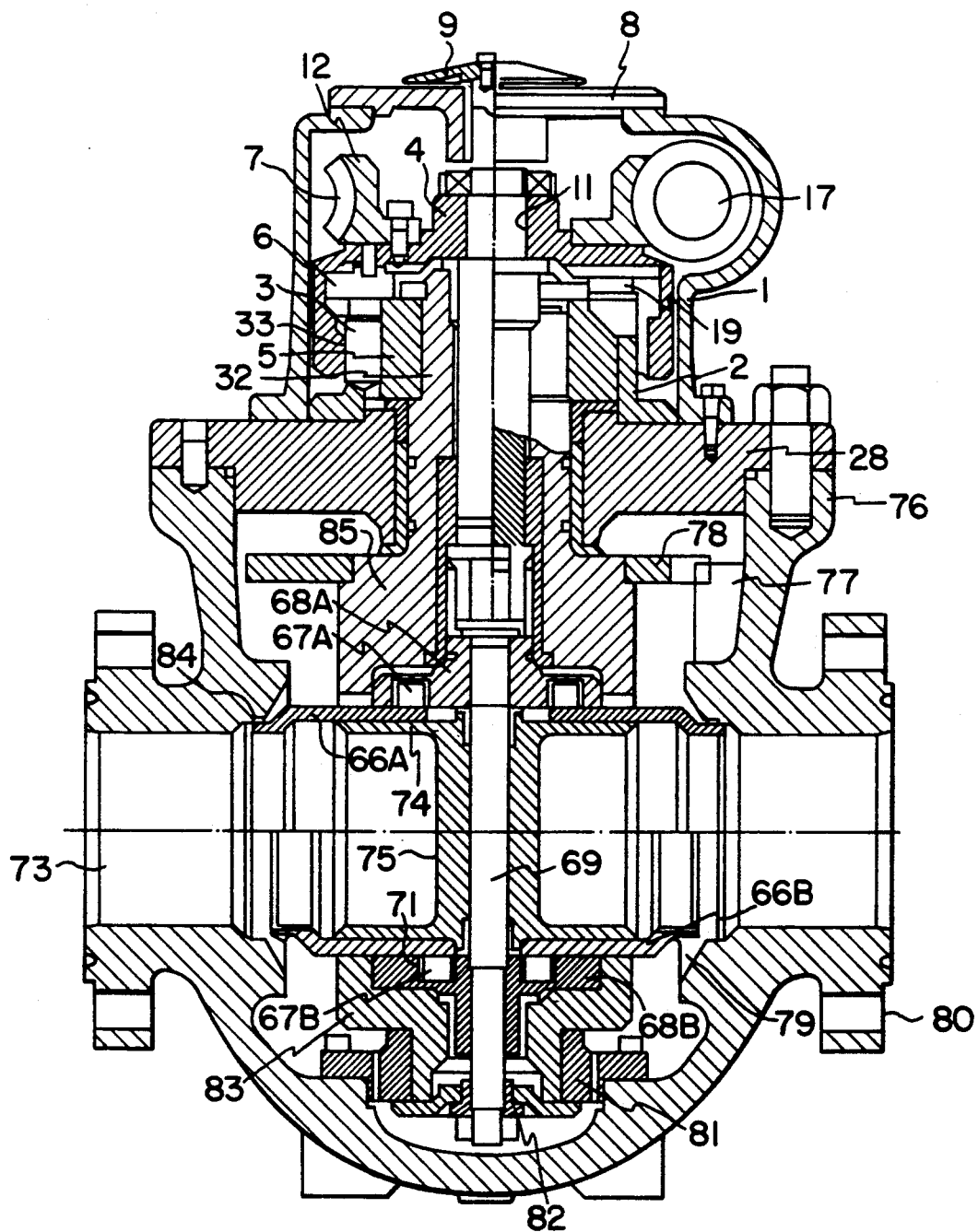

United States Patent [19]

Horvei

[11] Patent Number: 5,154,395

[45] Date of Patent: Oct. 13, 1992

[54] BALL VALVE AND ACTUATOR FOR OPERATING VALVES AND THE LIKE

[75] Inventor: Knut V. Horvei, Sandnes, Norway

[73] Assignee: Den norske stats oljeselskap a.s, Stavanger, Norway

[21] Appl. No.: 730,955

[22] PCT Filed: Jan. 12, 1990

[86] PCT No.: PCT/NO90/00008

§ 371 Date: Jul. 23, 1991

§ 102(e) Date: Jul. 23, 1991

[87] PCT Pub. No.: WO90/08277

PCT Pub. Date: Jul. 26, 1990

[30] Foreign Application Priority Data

Jan. 16, 1989 [NO] Norway .................... 89.0178

[51] Int. Cl.⁵ .................................................. F16K 5/00
[52] U.S. Cl. .................................... 251/161; 251/188
[58] Field of Search ............... 251/159, 161, 162, 163, 251/188

[56] References Cited

U.S. PATENT DOCUMENTS

| | | | |
|---|---|---|---|
| 2,879,798 | 3/1959 | Anderson | 251/164 X |
| 3,934,606 | 1/1976 | Matthews | 251/159 X |
| 4,727,901 | 3/1988 | Horvei | 251/161 X |

FOREIGN PATENT DOCUMENTS

| | | |
|---|---|---|
| 551241 | 5/1932 | Fed. Rep. of Germany ...... 251/162 |
| 2625987 | 2/1977 | Fed. Rep. of Germany . |
| 155737 | 2/1987 | Norway . |

Primary Examiner—John C. Fox
Attorney, Agent, or Firm—Foley & Lardner

[57] ABSTRACT

In one aspect the invention relates to a ball valve of the type comprising a ball member (83, 85) provided with two axially displaceable sleeves (66A, 66B) adapted to be displaced outwards to sealing engagement against seats provided in the surrounding valve housing (76) in the open position of the valve, so as to form a flow passage (73) through the valve, and which comprises a hollow drive axle for the rotary movement of the ball member between open and closed position and a drive spindle (12, 69) through the hollow drive axle, adapted to bringing about the axial displacement movement of the sleeves. On the drive spindle (69) and for rotation together with it there are provided two preferably disc shaped, first cam members (68A, 68B) on either side of the sleeves (66A, 66B) and the sleeves are provided with corresponding and cooperating second cam members (67A, 67B) for the axial displacement by rotation of the drive spindle (69) in relation to the ball member (83, 85). As a second aspect there is also described an actuator for operating valves and the like, in particular a ball valve as above, comprising a hollow output drive axle (32) and an output drive spindle (12) extended through the hollow drive axle, in order thereby to make possible two different operational movements by rotation of the drive axle (32) and the drive spindle (12), respectively. The ball valve and the actuator have particularly interesting uses in oil related industry and on oil rigs or the like.

9 Claims, 8 Drawing Sheets

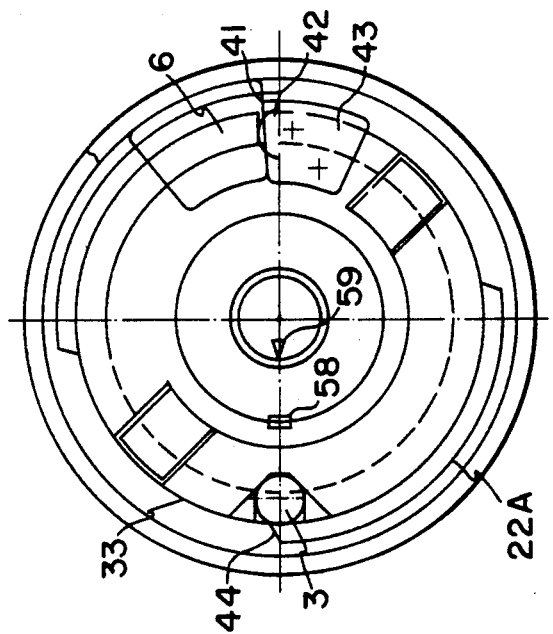
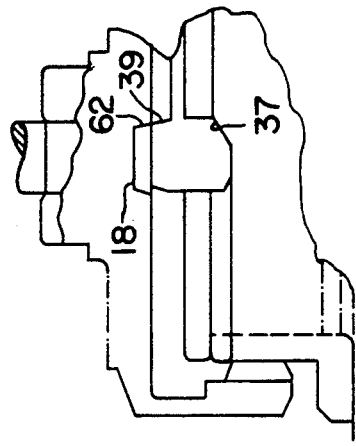
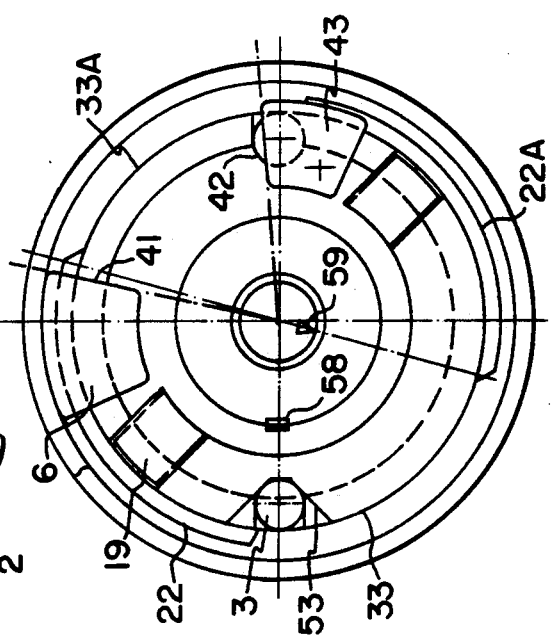
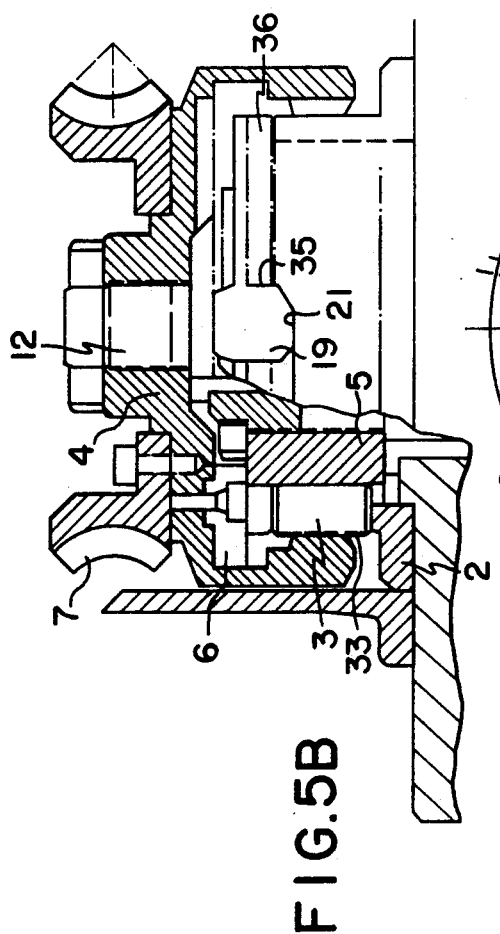

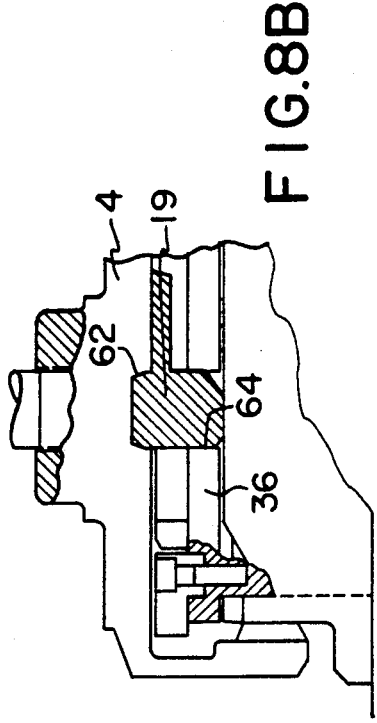
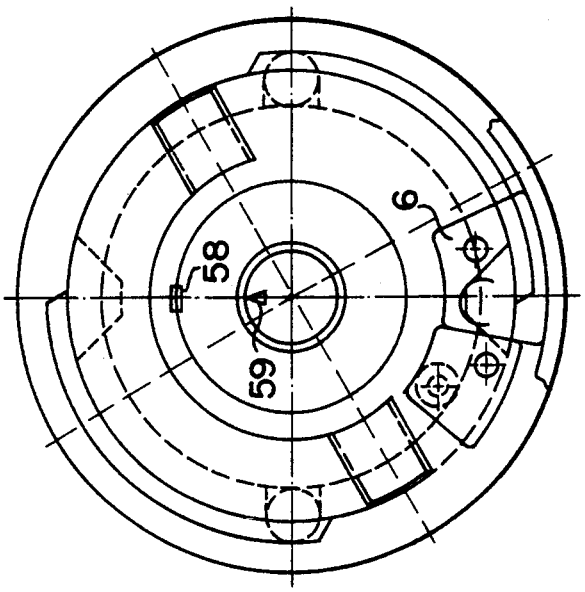
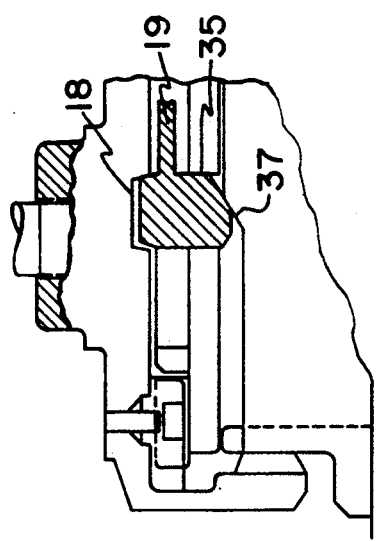
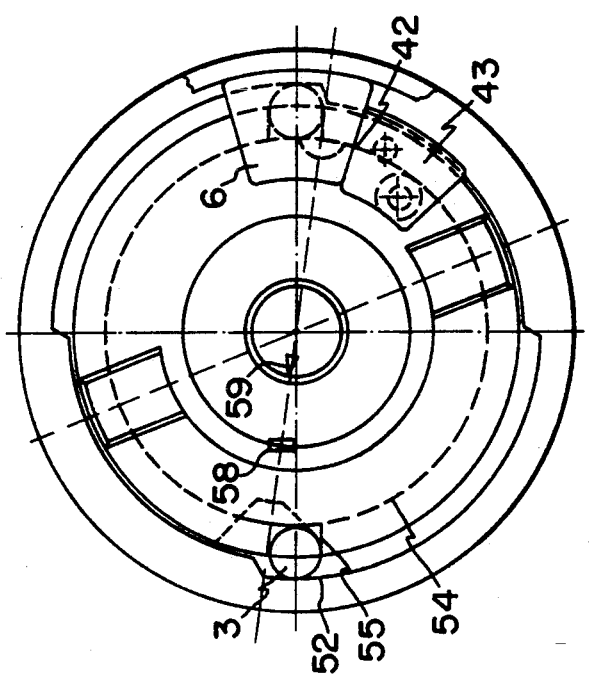

BALL VALVE AND ACTUATOR FOR OPERATING VALVES AND THE LIKE

In the Norwegian patent application, publication No. 159,553 there is described a ball valve with an associated actuator in particular intended for use in pipeline systems carrying gas and/or oil at large sea depths.

The known ball valve has a ball member provided with two axially displaceable sleeves which in the open position of the valve are adapted to be displaced outwards for tightly engaging seats provided in the surrounding valve housing, so as to form a flow passage through the valve. This further comprises a hollow drive axle for the rotary movement of the ball member between its open and closed positions, and a drive spindle through the hollow drive axle adapted to bring about the axial displacement of the sleeves.

The ball member in the known valve is divided into two ball parts being dismountably joined to each other. For operating the valve between open and closed position the published patent application describes a hydraulic solution and a mechanical solution respectively, the latter being based on a relatively complicated arrangement of gears and toothed racks.

The present invention is directed to a further development of the above known ball valve, particularly aiming at a simplified design which can be attractive in smaller valves than those being in the first place of interest in the above published application Thus, the present invention may be of more interest in installations above water than in underwater installations. Nor are there any requirements in connection with the present invention that the ball member of the valve shall be divided in two parts for easy dismounting, as in the previously known design referred to above.

Valves of the kind contemplated here require an actuator for simple, precise and reliable operation in order to be able to have a satisfactory function. Thus, this invention also comprises an actuator for this purpose, but this actuator is not necessarily limited in its utilization only for this particular ball valve, since also other manners of use may be possible.

Like the actuator for the ball valve according to Norwegian patent application, publication No. 159,553 the present actuator comprises a hollow output drive axle and an output drive spindle extending through the hollow drive axle, thereby to make possible two different operating movements by rotation of the drive axle and the drive spindle respectively.

In short, the ball valve aspect of this invention provides a partilarly simple and advantageous mechanism for bringing about the displacement movement of the sleeves in the ball member, whereas the actuator aspect according to the invention comprises a particular interlocking system which is specifically, but not exclusively, of interest for the ball valve.

More definite statements of both the ball valve and the actuator according to the invention, including the novel and specific features thereof, are found in the claims.

The structures described here are able to provide valuable contributions to simplifying valve systems for example in oil related industry, on oil rigs and the like. At the same time as the relatively simple structures lead to cost savings, they also contribute to a higher level of security at oil installations both on shore and off shore.

A particular advantage of the structures described here, consists therein that the opening and closing of the ball valve can take place by means of only a simple rotary movement of an input axle, for example provided for by operating a hand wheel.

Figure 2:
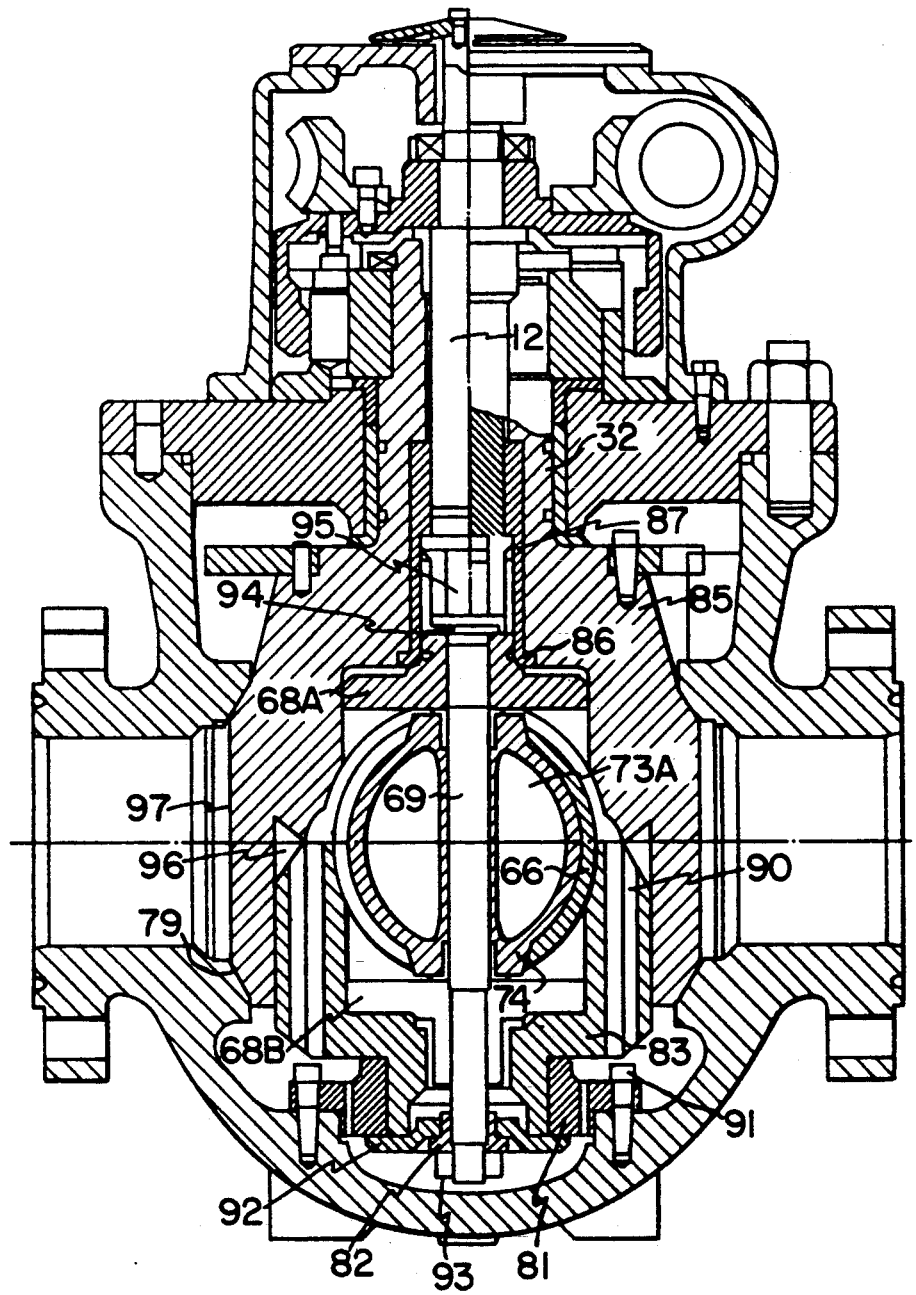
Figure 3:
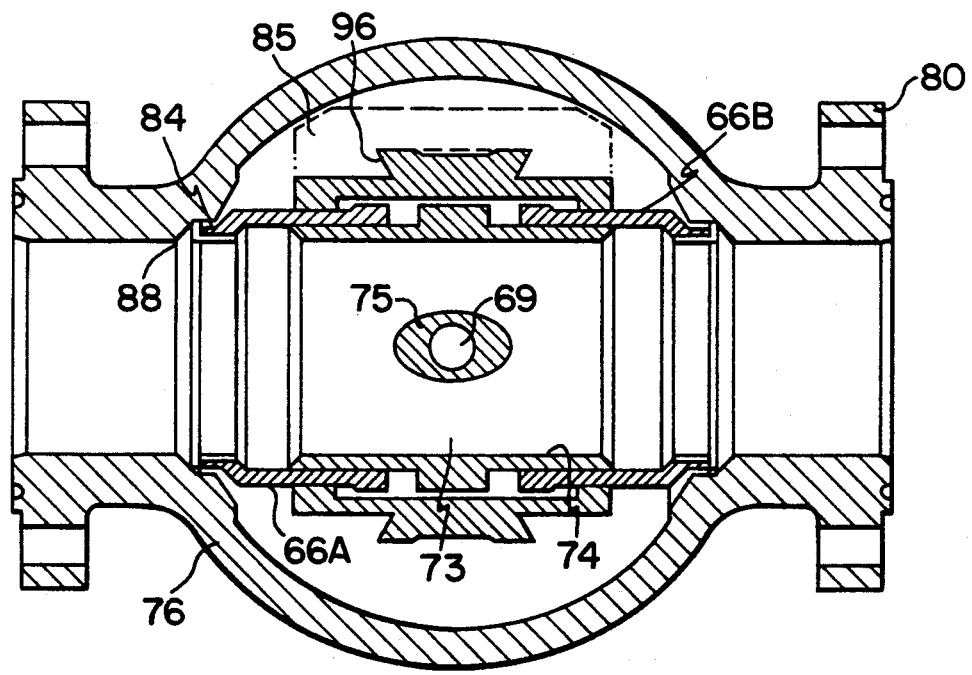
Figure 4A:
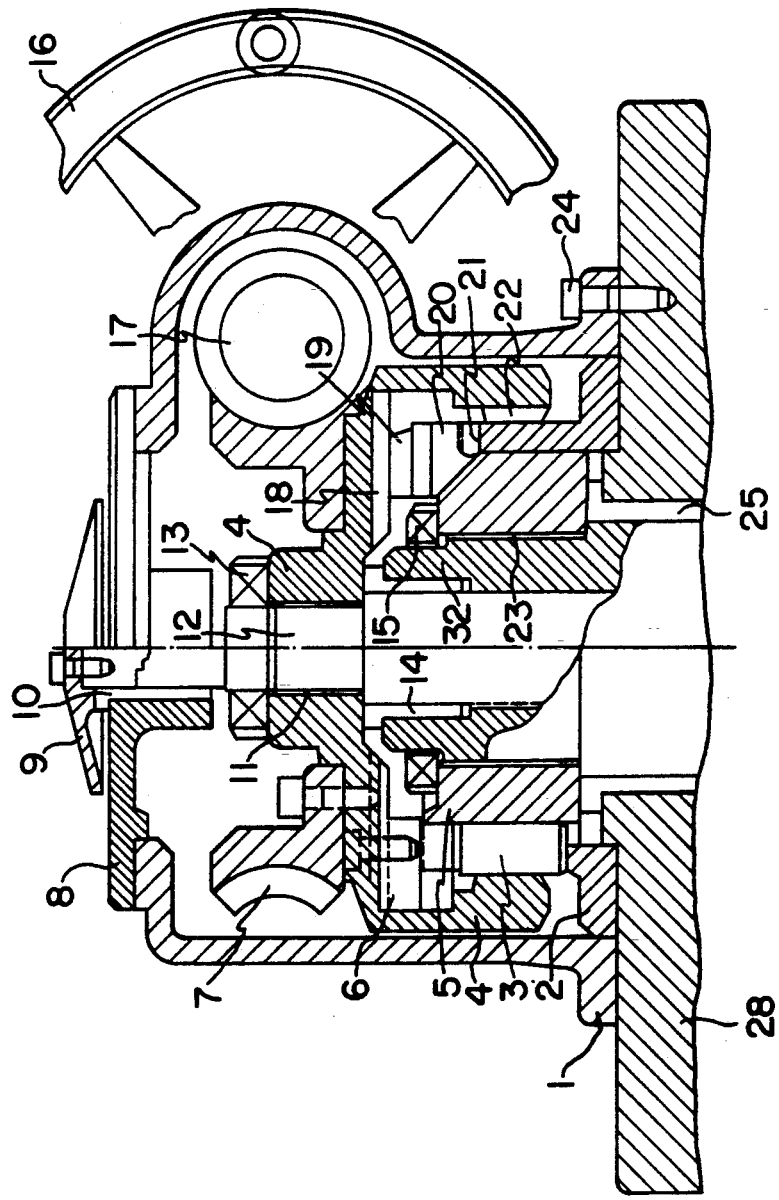
Figure 4B:
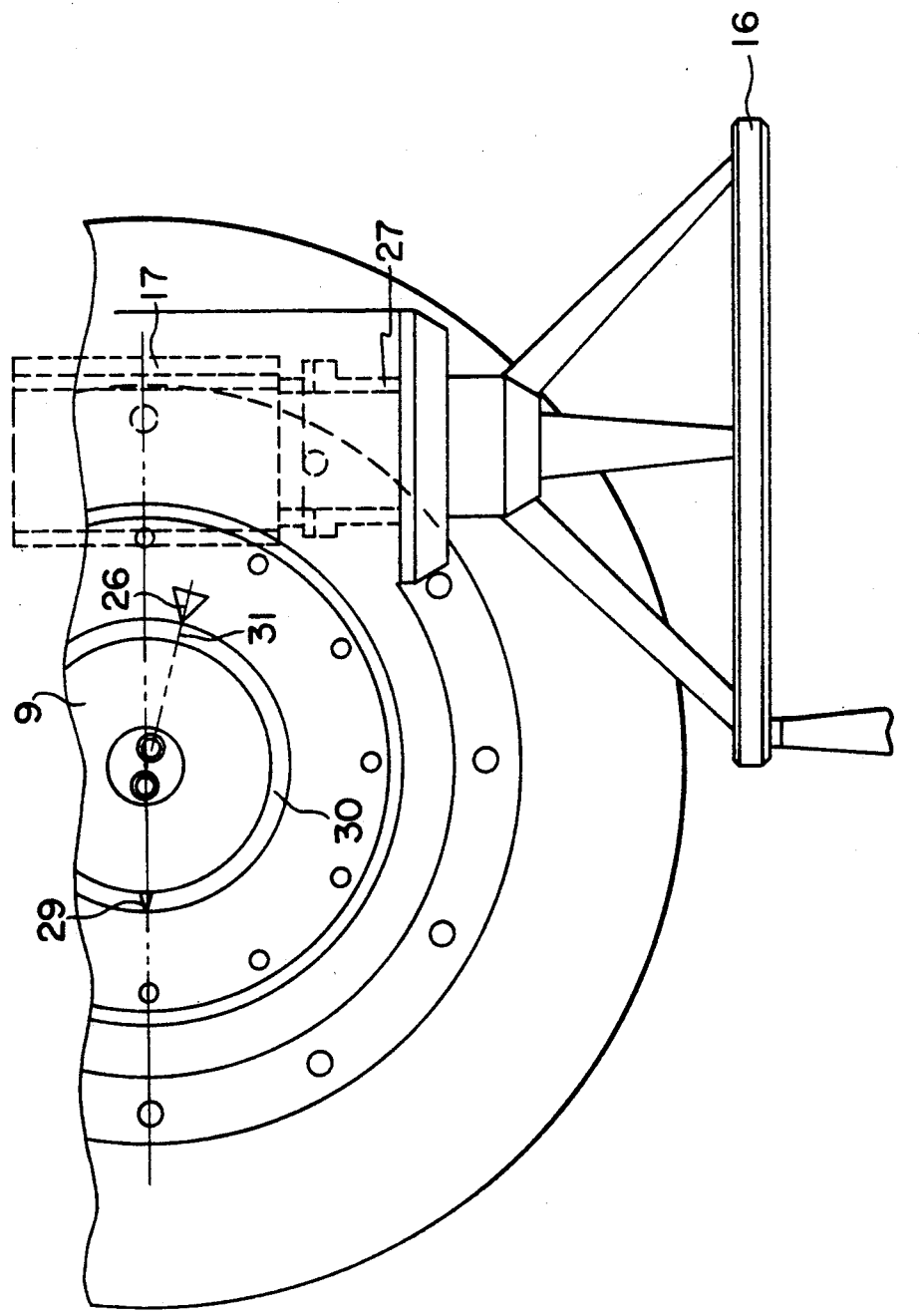
Figure 4D:
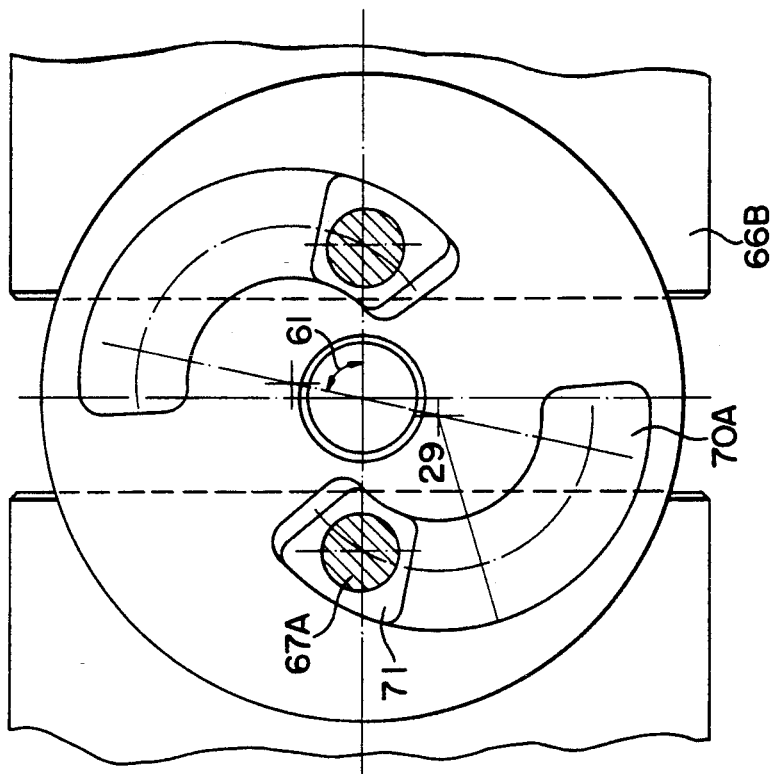
Figure 4C:
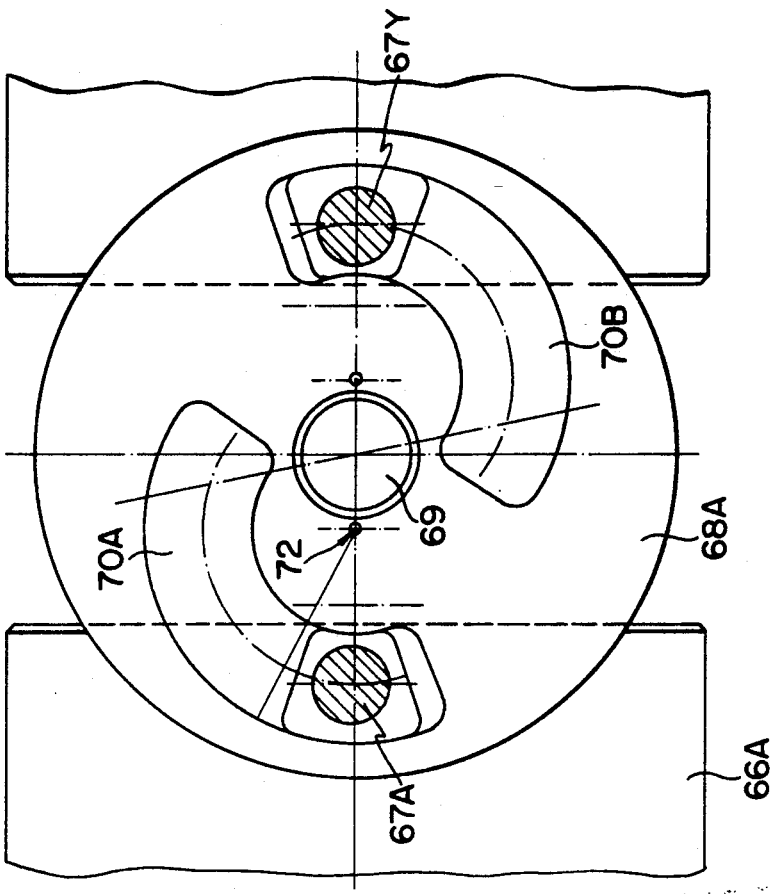

In the following description the invention shall be explained more closely with reference to an exemplary embodiment shown in the drawings, in which:

FIG. 1 shows an axial section of a ball valve with an actuator, based on designs according to the invention, whereby the valve is shown in its open position, FIG. 2 shows a similar section as in FIG. 1, but with the valve in its closed position, FIG. 3 shows a section along the axis of the flow passage and normally to the section according to FIG. 1, i.e. at a right angle to the rotational axis of the ball member and with the valve in its open position, FIG. 4A somewhat enlarged and in a sectional view as in FIG. 1, shows the actuator for the valve, FIG. 4B, shows the actuator of FIG. 4A seen from above and in part, FIGS. 4C and 4D schematically show cooperating cam means for movement of two sleeves being incorporated into the ball member in the valve according to FIGS. 1-3, FIGS. 5A and 5B show the actuator from above and in partial cross section respectively, corresponding to the open position of the valve, FIGS. 6A and 6B in a way corresponding to FIGS. 5A and 5B, show the actuator in a situation corresponding to open valve position, but with the sleeves retracted into the ball member from their seats in the valve housing, FIGS. 7A and 7B in a corresponding manner show a situation in which rotation of the ball member from open to closed, position has just been initiated, and FIGS. 8A and 8B in a corresponding manner show the actuator in a situation corresponding to completely closed valve.

The ball valve in FIGS. 1-3 has a valve housing 76 which by means of flanges, as for example shown at 80, can be connected into a pipeline system. A ball member in the valve housing has two main parts 83 and 85 which can be joined in a similar way as the corresponding main parts of the ball member in the valve described in the Norwegian patent application publication referred to above. As will be seen in particular from FIGS. 2 and 3 the upper ball part 85 is provided with dovetail grooves 96 for cooperation with complementary portions of the lower ball part 83. In association with the latter portions there are shown bores 90 for giving access to bolts 91 serving to attach a bearing support 81 for the lower ball part, to the valve housing 76.

The lower end of a drive spindle 69 is journalled by means of a ring 82 in a disc 92 and fixed by means of nuts 93.

At the upper side of the ball member there is provided a bearing 87 with a spacing ring 86 within the upper ball part 85 which is extended upwards in the form of a drive axle into the actuator which is mounted on top of the valve itself, i.e. on a strong cover 28 which is bolted to an upper flange of the valve housing 76. The drive axle 32 is journalled in the cover 28.

In the closed position of the valve as shown in FIG. 2, a spherical sealing plate or surface 97 on either side of the ball part 85 forms a seal against a valve seat 79 at either side of the valve housing.

In FIG. 1 two displaceable sleeves 66A and 66B are shown in their fully outward positions (the upper halves of the sleeves) and in their retracted position (the lower halves of the sleeves), respectively. These sleeves slide outwardly on a carrier member 74 which constitutes an inner part of the ball member and has a stem 75 for extending the drive spindle 69 through the flow passage of the valve. As seen in particular in FIG. 3, this stem 75 has a stream-lined shape in order to have the least possible influence on the through-flow when the valve is open. Besides, FIG. 3 also shows the sleeves 66A and 66B in their fully outward positions with sealing as shown at 84 against a seat 88 in the valve housing 76. Whereas the complete flow passage is denoted 73 in FIGS. 1 and 3, one half of the flow cross sectional area at the level of the stem 75 is denoted 73A in FIG. 2.

The ball valve as described thus far broadly corresponds to the one shown in the patent application publication mentioned above, except for the passage of the drive spindle 69 downwards towards the bottom of the valve housing 76.

The particular structure for obtaining the displacement movement of the sleeves 66A and 66B by transforming the rotary movement of the drive spindle into the translatory movement of the sleeves shall now be described more closely. On the drive spindle 69 there are mounted two disc shaped cam members in the form of so-called link discs 68A and 68B, lying one at each side of the sleeves, i.e. above respectively underneath these. As shown more clearly in FIGS. 4C and 4D these discs 68A and 68B are provided with grooves for cooperation with pins 67A and 67B respectively, as shown at the top and at the bottom, respectively, of the sleeve 66A in FIG. 1. These pins are adapted to slide in the grooves during rotation of the discs 68A and 68B, these grooves extending at varying radial distance from the axis of the spindle 69 and thereby providing for displacement of the sleeves outwardly or inwardly in relation to the axis, depending upon the direction of rotation.

The link disc 68A in FIG. 4C has two curved grooves 70A and 70B which extend at an increasing distance from the drive spindle 69. More particularly these grooves are in the form of arcs of a circle having the centre located outside the axis of the drive spindle 69, namely at 72 as illustrated with respect to the groove 70A. In the rotary position shown in FIG. 4C the sleeves 66A and 66B are displaced to a maximum outwards, which means that the pin elements 67A and 67Y are located in the outermost portion of the grooves 70A and 70B. In this position the centre of curvature 72 lies on a line coinciding with the axial plane through the sleeves 66A and 66B, which involves the substantial advantage that the forces acting axially on these sleeves are not able to excert any moment which could rotate the disc 68A from the position shown in FIG. 4C.

When the actuator rotates the drive spindle 69 counter-clockwise in FIGS. 4C and 4C, the grooves 70A and 70B will result in a retracting movement of the sleeves, so that these will end up in approximately completely retracted position as shown in FIG. 4D, with the pin elements in the innermost portion of the grooves. It will be understood that the extent of the displacement movement corresponds to the difference in radial distance from the axis of the drive spindle to the effective path of the pin element in the grooves concerned, i.e. to a (curved) center line of the groove. As shown particularly in FIG. 4D the pin 67A on the sleeve 66A can be provided with a slide piece 71 having two cylindrical surfaces corresponding to the inner and outer wall surfaces respectively of the groove 70A.

From the above it also appears that the two grooves 70A and 70B in the link discs, for example in disc 68A, have an angular spacing of 180° with respect to each other about the axis of the drive spindle 69. The effective rotational angle which the grooves provide for with respect to the sliding movements of the pin elements therein, preferably lie within a range from 70° to 80°, with 75° as a most preferred angle. This choice of angular range is related to the total angular movement which advantageously can be utilized for the complete valve operation from open to closed position and vice versa. This total angular range in practice can most suitably be about 180°. Of this total angular range 90° will be used for rotating the actual ball member between its open and closed positions. To a certain degree these angular relationships are connected to the design of the actuator which shall move the valve between the various sequences, including the displacement movement of the sleeves described. The angular range referred to here for the grooves in the link discs, in FIG. 4D is indicated at 61.

This arrangement of cooperating cam members as particularly explained with reference to FIGS. 4C and 4D, is simple and reliable since each sleeve will have a balanced force application when being pushed out and retracted respectively, in relation to the ball member when this has a fixed location in the position corresponding to open valve. The cam arrangement gives a pure translatory movement of the sleeves, so that normally there will not be necessary to provide specific means for securing that these are not rotated during the displacement.

Reference is again made to FIG. 1 in which a stop member with double-sided action is attached at the upper portion of the upper ball part 85. This stop member has the form of a disc 78 having a cut-out sector so as to form stops adapted to cooperate with a stationary stop element 77 internally in the housing 76. This arrangement of stops in a way known per se secures a definite arresting of the rotation of the ball member in its respective angular positions corresponding to closed valve and open valve. In the latter position it is of much importance that the angle is accurately determined, because the sleeves 66A and 66B on displacement outwards must engage their seats 88 (FIG. 3) as exactly as possible.

The basic parts of the actuator shall now first be described with reference to FIG. 1 and particularly FIGS. 4A and 4B. The motive force being applied to the actuator is supplied in the form of a simple rotation of an input axle 17, which for example can be a hand wheel 16 (shown in part in FIG. 4A). Of course there may be thought of many alternatives for rotating the input axle 17, for example a hydraulic motor or the like. The output movements from the actuator, for example for operating a ball valve as described above, is provided for by the hollow drive axle 32 as already described, and an upper drive spindle 12 which is rotationally coupled to the previously described or lower drive spindle 69 by means of a coupling 95 which is shown particularly in FIG. 2. In association with this coupling the drive spindle 69 has an upper ring or disc 94. When disassembling the actuator and possibly the upper ball member 85 from the valve, as also described in Norwegian patent application, publication No. 159,553, the coupling at 95 between the two parts of the complete drive spindle is loosened.

The various mechanisms of the actuator are contained in a housing 1 which by means of screws 24 or in other way is attached to the valve cover 28. To this cover there is also attached a stationary control or lock ring 2 which has important functions in the interlocking system which is comprised by the actuator.

The input axle 17 is provided with a worm screw being in engagement with a worm wheel 7 which in turn is bolted to a crown or actuator wheel 4 which is a central component in the actuator. At 11 the drive spindle 12 is keyed to the actuator wheel 4 and thereby to the worm wheel 7, so that the drive spindle 12, the actuator wheel 4, the worm wheel 7 and the worm screw or input axle 17 and thereby the hand wheel 16 are rotationally and firmly interconnected. The hollow drive axle 32, however, is adapted to only during certain operation sequences to be rotationally coupled to the actuator wheel 4.

A previously mentioned the drive axle 32 is journalled, inter alia, in the cover 28 by means of a bearing 25 and at its upper portion is provided with a boss 5 which in various ways is adapted to cooperate with the actuator wheel 4. By means of a mounting nut 15 the boss 5 is attached to the hollow drive axle 32.

For indicating the sequences involved in the operation of for example a valve, by means of this actuator, the top of the actuator housing 1, which has a top cover 8, is provided with an indicator disc 9 attached to the upper end of the drive spindle 12 which has a bearing 10 in the top cover 8. Immediately underneath the bearing 10 in FIG. 4A there is shown an anchoring nut 13 for the actuator wheel 4 on the drive spindle 12.

In FIG. 4B, which shows the top of the actuator seen from above, indication arrows at 29 and 31 on the indicator disc 9 show CLOSED position and OPEN position respectively of the associated valve. These indications can be observed in relation to an indicator marking 26 in the top surface of the top cover 8. An additional marking 30 on the indicator disc 9 serves to show the position corresponding to open valve with the sleeves retracted into the ball member (FIG. 1 lower half of the sleeves and FIG. 4D). The direction of rotation of the indicator disc 9 and thereby the drive spindle 12 thus is counterclockwise for bringing the valve from its open to its closed position, which corresponds to the direction of rotation of the link discs in FIGS. 4C and 4D. FIG. 4B also shows a bearing 27 for the input axle-worm screw 17 with hand wheel 16.

As explained previously it is of significance to be able to fix the angular position of the ball member and thereby the hollow axle 32 with its associated boss 5, when the valve is in its open position with a possibility for the above displacement of the sleeves in the ball member. Securing or interlocking of the parts described in this angular position takes place by means of locking elements in the form of two rollers 3 being located diametrically opposite to each other as for example seen in FIG. 5A. These rollers 3 are lying restricted against movements in the circumferential direction by grooves 55 (see FIG. 7A) formed in the upstanding cylindrical portion of the locking ring 2 which extends around and outside the boss 5. In this boss there are provided grooves 53 which are widened radially outwards and which have dimensions adapted for having the rollers 3 pressed therein. This pressing, which gives the desired interlocking or locking effect, is provided for by a cam control path 33 formed on the interior circumference of a lower portion of the actuator wheel 4. As will be seen from FIG. 5A the control cam 33 extends over a certain angular range of this inner circumference at a sufficient distance to make the above interlocking effective during all the required rotary movement of the drive spindle 69 in relation to the drive axle 32 in order to bring the sleeves 66A and 66B from their fully retracted to their fully outward position or vice versa. (The direction of rotation in FIGS. 5A–8A is the opposite of that in FIGS. 4B–4C–4D). When rotating the actuator wheel 4 clockwise from the situation in FIG. 5A to the one in FIG. 6A, the control cam 33 will thus all the time keep the roller 3 within the locking groove 53 in the boss 5, so that a secure interlocking effect is established during the complete displacement movement of the sleeves. Quite correspondingly and symmetrically the locking roller located diametrically opposite to the shown roller 3, is influenced by a similar control cam which in FIG. 5A is denoted 33A. Between the control cams 33 and 33A the inner circumference of the actuator wheel 4 has more set-back or radially widened cam portions 22 and 22A which allows the rollers 3 to be pressed out of their locking relation with the boss 5 in grooves 53. Just this will take place in the situation shown in FIG. 6A upon continued rotation of the actuator wheel clockwise, whereby the roller 3 will be moved radially outwards against the cam portion 22A which at this instant starts to move into the angular position of the roller 3. An inclined edge 44 at the end of the cam surface 22A in association with the inclined position of the edge of the groove 53 (FIG. 5A), are important details for the movement of the roller 3 into and out of its locking position.

When the described interlocking is released upon continued rotation clockwise from the position shown in FIG. 6A, a carrier member 6 in the actuator wheel 4 will cooperate with a carrier element 43 attached to the boss 5, so that this boss and thereby the hollow drive axle 32 and the whole ball member in the ball valve, are rotated from the open position to the closed position. More particularly the carrier member 6 has an engagement face 41 and the carrier element 43 has a corresponding engagement face 42, these faces being in FIG. 6A shown in contact with each other.

After a further certain rotation to the position in FIG. 7A it can be seen that the locking roller 3 has come out of its groove 53 in the boss 5 so that the latter has been able to initiate its rotation as mentioned. Thus, in FIG. 7A the circumference or outer surface 54 of the boss 5 is free to pass by the roller 3.

The common rotary motion continues by means of the carrier members 6 and 43 to the end position shown in FIG. 8A, corresponding to closed valve as in FIG. 2. As shown in FIG. 8A this position of the valve is indicated by markings 58 and 59. Thus, in this position the valve is closed and the sleeves in the ball member are retracted. The corresponding markings in FIG. 7A indicate the initiation of the rotary movement of the ball member from open towards closed position, the sleeves having just been retracted. For the sake of completeness reference is further made to FIGS. 5A and 6A in which the markings 58 and 59 also show the relative angular position of the drive spindle 12 and thereby the spindle 69, at the start and the termination respectively, of the movement of the sleeves from their outward to their retracted position.

The previously described carrier means 6 and 43 with stop surfaces 41 and 42 respectively, exclusively serve to rotate the drive axle 32 in a first direction from a first given angular position as illustrated in FIG. 6A, to a second given angular position as shown in FIG. 8A. For rotation in the opposite direction from the position of FIG. 8A to the position of FIG. 6A, the actuator has another carrier means the main elements of which are a cam activated carrier piece 19 and a corresponding carrier groove 18 formed at the inside or underside of the actuator wheel 4. A collar 36 on the boss 5 has a recess 35 for the carrier piece 19 so that this is firmly rotationally coupled to the boss 5 and thus to the drive axle 32. At the top of the locking ring 2 there is formed a cam control with a control cam 21 which covers that portion of the rotary motion during which the carrier piece shall not be in engagement with the groove 18, an inclined surface 37 on this control cam (FIG. 6B) bringing the carrier piece 19 into the groove 18 substantially at the same instant as the first carrier means with engagement faces 41 and 42 become operative. Accordingly, the second carrier means with carrier piece 19 and groove 18 will be in engagement during substantially the whole rotary movement from the position of FIG. 6A through the one in FIG. 7A to the end position or closed valve as shown in FIG. 8A. Then the second carrier means is ready for its function by rotation of the actuator wheel 4 and the ball member in opposite direction from closed valve position to open valve position. During this return rotation the engagement surface 62 in groove 18 acts against the carrier piece 19 which in turn through the engagement edge 64 in the collar 36 on the boss 5, transfers the rotary movement from the actuator wheel 4 to the drive axle 32 and thereby to the ball member.

The opposite movement from closed valve position towards open position, involves sequences in the opposite order and direction from what is described above. At the terminating rotation of the hand wheel 16 this can be adapted to move against a mechanical stop at the instance when the sleeves are fully pushed out against their sealing seats in the valve housing.

The mechanical actuator described here makes it possible by means of only one form of operation or movement of the hand wheel, through the intermediary of a built-in interlocking system, to carry out all necessary operations needed in order to effect closing or opening of a ball valve or the like. The design is of particular interest in connection with ball valves having displaceable sleeves, in which the valve operation takes place in sequences and with an interlocking in order to secure the valve in correct positions in some of the sequences. Thus all these necessary operations can be carried out precisely and in a correct order only by a single operational or movement pattern, which can for example be effected by rotating a hand wheel through a number of turns from one end stop to another end stop.

I claim:
1. A ball valve comprising:
a valve housing having seats;
a ball member surrounded by the valve housing and having a pair of axially displaceable sleeves which are adapted to be axially displaced outwardly from the ball valve and into tight engagement with the seats when the ball valve is in an open position, thereby forming a flow passage through the ball valve;
a hollow drive axle for moving the ball member in a rotary manner between the open position and a closed position of the ball valve;
a rotatable drive spindle passing through the hollow drive axle and being adapted to axially displace the sleeves; and
first substantially disc shaped cam members each being disposed on the drive spindle adjacent to at least one side of each of the sleeves, such that the first cam members rotate with the drive spindle;
wherein the sleeves each include second cam members each of which cooperate with a corresponding one of the first cam members such that the sleeves are axially displaced relative to the ball member when the drive spindle rotates.

2. A ball valve according to claim 1, wherein the first cam members are formed by two link discs (68, 68A, 68B) provided with grooves (70A, 70B), the two link discs extending in respective planes which are normal to the axis of the drive spindle (69), and wherein the second cam members are in the form of pin elements (67A, 67B) projecting into the grooves such that the pin elements slide within the grooves when the drive spindle is rotated.

3. A ball valve according to claim 2, wherein each of the link discs (68A, 68B) is provided with two curved, substantially arc-circular grooves (70A, 70B) which are spaced at an angle of 180° in relation to each other about the axis of the drive spindle, and each of the curved grooves cooperates with a respective one of the pin elements (67A, 71, 67Y) on a respective one of the sleeves (66A, 66B).

4. A ball valve according to claim 3, wherein each of the curved grooves (70A, 70B) is shaped as a circular arc having a centre (72) such that when the sleeves are axially displaced to a fully outward position, the centre of each circular arc lies in a plane defined by the axis of the drive spindle and a common axis of the sleeves (66A, 66B).

5. A ball valve according to claim 4, wherein each pin element includes a round pin (67A) projecting radially from the sleeve (66A) adjacent an inner end thereof, and a slide piece (71) being pivotably mounted on the pin (67A) and having glide surfaces shaped in accordance with cooperating surfaces in the corresponding cooperating groove (70A).

6. A ball valve according to claim 2, wherein each of the grooves (70A, 70B) extend over an effective angular range of approximately 70°–80° around the axis of the drive spindle.

7. A ball valve according to claim 6, wherein the effective angular range is 75°.

8. A ball valve according to claim 1, further comprising a hollow stem (75) having a stream-lined cross sectional shape which extends the drive spindle (69) diametrically through the flow passage (73, 73A) of the ball member.

9. A ball valve according to claim 1, wherein at least one of the hollow drive axle (32) and the ball member (85) is provided with a double-acting stop member (73) which is adapted to cooperate with a stationary stop element (77) in the valve housing (76), thereby establishing a well defined limitation of a movement of the ball member in the rotary manner towards the open and the closed position of the ball valve.

* * * * *